US010937231B2

(12) United States Patent
Yang et al.

(10) Patent No.: US 10,937,231 B2
(45) Date of Patent: Mar. 2, 2021

(54) SYSTEMS AND METHODS FOR UPDATING A HIGH-RESOLUTION MAP BASED ON BINOCULAR IMAGES (71) Applicant: BEIJING DIDI INFINITY TECHNOLOGY AND DEVELOPMENT CO., LTD., Beijing (CN)

(72) Inventors: Sheng Yang, Beijing (CN); Teng Ma, Beijing (CN); Xiaozhi Qu, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 50 days.

(21) Appl. No.: 16/215,985

(22) Filed: Dec. 11, 2018

(65) Prior Publication Data
US 2019/0385360 A1 Dec. 19, 2019

Related U.S. Application Data (63) Continuation of application No. PCT/CN2018/091293, filed on Jun. 14, 2018.

(51) Int. Cl.
*G06T 17/05* (2011.01)
*G06T 7/593* (2017.01)
(Continued)

(52) U.S. Cl.
CPC ............ *G06T 17/05* (2013.01); *G01S 7/4808* (2013.01); *G01S 17/42* (2013.01); *G01S 17/86* (2020.01);
(Continued)

(58) Field of Classification Search
None
See application file for complete search history.

(56) References Cited

U.S. PATENT DOCUMENTS 9,589,355 B2   3/2017  Modica et al.
9,612,123 B1   4/2017  Levinson et al.
(Continued)

FOREIGN PATENT DOCUMENTS

CN   106525057 A   3/2017
CN   107241441 A   10/2017
(Continued)

OTHER PUBLICATIONS

Xu et al. "3D Point Cloud Map Based Vehicle Localization Using Stereo Camera", Jun. 11, 2017, IEEE Intelligence vehicle symposium (IV) (Year: 2017).*

(Continued)

*Primary Examiner* — Robert J Craddock
(74) *Attorney, Agent, or Firm* — Bayes PLLC (57) ABSTRACT

Embodiments of the disclosure provide systems and methods for updating a high-resolution map. The system may include a communication interface configured to receive a plurality of image frames captured by a binocular camera equipped on a vehicle, as the vehicle travels along a trajectory. The system may further include a storage configured to store the high-resolution map and the plurality of image frames. The system may also include at least one processor. The at least one processor may be configured to generate point cloud frames based on the respective image frames. The at least one processor may be further configured to position the vehicle using the point cloud frames. The at least one processor may be further configured to merge the point cloud frames based on the vehicle positions. The at least one processor may also be configured to update a (Continued)

portion of the high-resolution map based on the merged point cloud.

17 Claims, 5 Drawing Sheets

(51) Int. Cl.
    *G06T 7/80*     (2017.01)
    *G06T 7/73*     (2017.01)
    *H04N 13/239*     (2018.01)
    *H04N 13/271*     (2018.01)
    *G01S 7/48*     (2006.01)
    *G01S 17/42*     (2006.01)
    *G01S 17/89*     (2020.01)
    *G01S 17/86*     (2020.01)

(52) U.S. Cl.
    CPC .............. *G01S 17/89* (2013.01); *G06T 7/593* (2017.01); *G06T 7/73* (2017.01); *G06T 7/85* (2017.01); *H04N 13/239* (2018.05); *H04N 13/271* (2018.05); *G06T 2207/10012* (2013.01); *G06T 2207/10028* (2013.01); *G06T 2207/20084* (2013.01); *G06T 2207/30248* (2013.01)

(56) References Cited

U.S. PATENT DOCUMENTS

| | | | |
|---|---|---|---|
| 10,140,530 B1* | 11/2018 | Jagannath | G06K 9/00798 |
| 2012/0016578 A1 | 1/2012 | Coppens | |
| 2018/0023961 A1 | 1/2018 | Fridman | |
| 2018/0075648 A1 | 3/2018 | Moghadam et al. | |

FOREIGN PATENT DOCUMENTS

| | | |
|---|---|---|
| CN | 107246876 A | 10/2017 |
| CN | 107856645 A | 2/2018 |
| CN | 106898249 B | 5/2018 |
| CN | 108007453 A | 5/2018 |
| EP | 3324209 A1 | 5/2018 |
| EP | 3324210 A1 | 5/2018 |
| TW | 201227604 A | 7/2012 |
| WO | 2018035508 A1 | 2/2018 |
| WO | 2019000417 A1 | 1/2019 |

OTHER PUBLICATIONS

Fu et al. "Stereo Matching Confidence Learning Based on Multi-modal Convolution Neural Networks" Date: Dec. 20, 2017 Year: (2017).*
International Search Report in PCT/CN2018/091293 dated Mar. 1, 2019, 4 Pages.
Written Opinion in PCT/CN2018/091293 dated Mar. 1, 2019, 4 Pages.
Jakob Engel et al., Large-scale Direct SLAM with Stereo Cameras, 2015 IEEE/RSJ International Conference on Intelligent Robots and Systems (IROS), 2015.
A. K. Aijazi et al., Detecting and Updating Changes in Lidar Point Clouds for Automatic 3D Urban Cartography, ISPRS annals of the photogrammetry, Remote sensing and spatial information sciences, 2: 7-12, 2013.
Xu, Yuquan et al., 3D Point Cloud Map Based Vehicle Localization Using Stereo Camera, 2017 IEEE intelligent vehicles symposium (IV), 2017.
The Extended European Search Report in European Application No. 18811122.3 dated Aug. 21, 2019, 10 pages.
The Australian Examination Report in Australian Application No. 2018278901 dated Jun. 27, 2019, 7 pages.

* cited by examiner

SYSTEMS AND METHODS FOR UPDATING A HIGH-RESOLUTION MAP BASED ON BINOCULAR IMAGES

CROSS-REFERENCE TO RELATED APPLICATIONS

This application is a continuation of international Application No. PCT/CN2018/091293, filed on Jun. 14, 2018, the entire contents of which are hereby incorporated by reference.

TECHNICAL FIELD

The present disclosure relates to systems and methods for updating a high-resolution map, and more particularly to, systems and methods for updating a high-resolution map based on images captured by binocular cameras.

BACKGROUND

Autonomous driving technology relies heavily on an accurate map. For example, accuracy of a navigation map is critical to functions of autonomous driving vehicles, such as positioning, ambience recognition, decision making and control. High-resolution maps may be obtained by aggregating images and information acquired by various sensors, detectors, and other devices equipped on vehicles as they drive around. For example, a vehicle may be equipped with multiple integrated sensors such as a LiDAR radar, a Global Positioning System (GPS) receiver, one or more Inertial Measurement Unit (IMU) sensors, and one or more cameras, to capture features of the road on which the vehicle is driving or the surrounding objects. Data captured may include, for example, center line or border line coordinates of a lane, coordinates and images of an object, such as a building, another vehicle, a landmark, a pedestrian, or a traffic sign.

Due to re-planning, new developments, constructions, and other infrastructure changes, high-resolution maps need to be updated routinely in order to accurately reflect the road information. For example, a single-lane road may be expanded to a two-lane road, and accordingly, the road marks, traffic signs, traffic lights, and the surrounding objects, such as trees and buildings, may change or move. Updating a high-resolution map typically requires dispatching a survey vehicle to re-survey the portion of the road that has been changed. However, dispatching the million-dollar worth survey vehicle equipped with LiDAR to acquire map data every time a change occurs, and maintaining the survey vehicle may amount to a significant cost and thus not economically viable. It may also require considerable human interventions, which translate to an even higher cost. On the other hand, updating the map with low-resolution data acquired by low-cost equipment impairs the quality of the map. For example, monocular cameras do not provide depth information that is necessary for reconstructing a three-dimensional (3-D) model. Therefore, an improved system and method for updating a high-resolution map is needed.

Embodiments of the disclosure address the above problems by methods and systems for updating a high-resolution map based on images acquired by binocular cameras.

SUMMARY

Embodiments of the disclosure provide a system for updating a high-resolution map. The system may include a communication interface configured to receive a plurality of image frames captured by a binocular camera equipped on a vehicle, as the vehicle travels along a trajectory. The system may further include a storage configured to store the high-resolution map and the plurality of image frames. The system may also include at least one processor. The at least one processor may be configured to generate point cloud frames based on the respective image frames. The at least one processor may be further configured to position the vehicle using the point cloud frames. The at least one processor may be further configured to merge the point cloud frames based on the vehicle positions. The at least one processor may also be configured to update a portion of the high-resolution map based on the merged point cloud.

Embodiments of the disclosure also provide a method for updating a high-resolution map. The method may include receiving, by a communication interface, a plurality of image frames captured by a binocular camera equipped on a vehicle, as the vehicle travels along a trajectory. The method may further include generating, by at least one processor, point cloud frames based on the respective image frames. The method may further include positioning, by the at least one processor, the vehicle using the point cloud frames. The method may further include merging, by the at least one processor, the point cloud frames based on the vehicle positions. The method may also include updating, by the at least one processor, a portion of the high-resolution map based on the merged point cloud.

Embodiments of the disclosure further provide a non-transitory computer-readable medium having instructions stored thereon that, when executed by one or more processors, causes the one or more processors to perform a method for updating a high-resolution map. The method may include receiving a plurality of image frames captured by a binocular camera equipped on a vehicle, as the vehicle travels along a trajectory. The method may further include generating point cloud frames based on the respective image frames. The method may further include positioning the vehicle using the point cloud frames. The method may further include merging the point cloud frames based on the vehicle positions. The method may also include updating a portion of the high-resolution map based on the merged point cloud.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
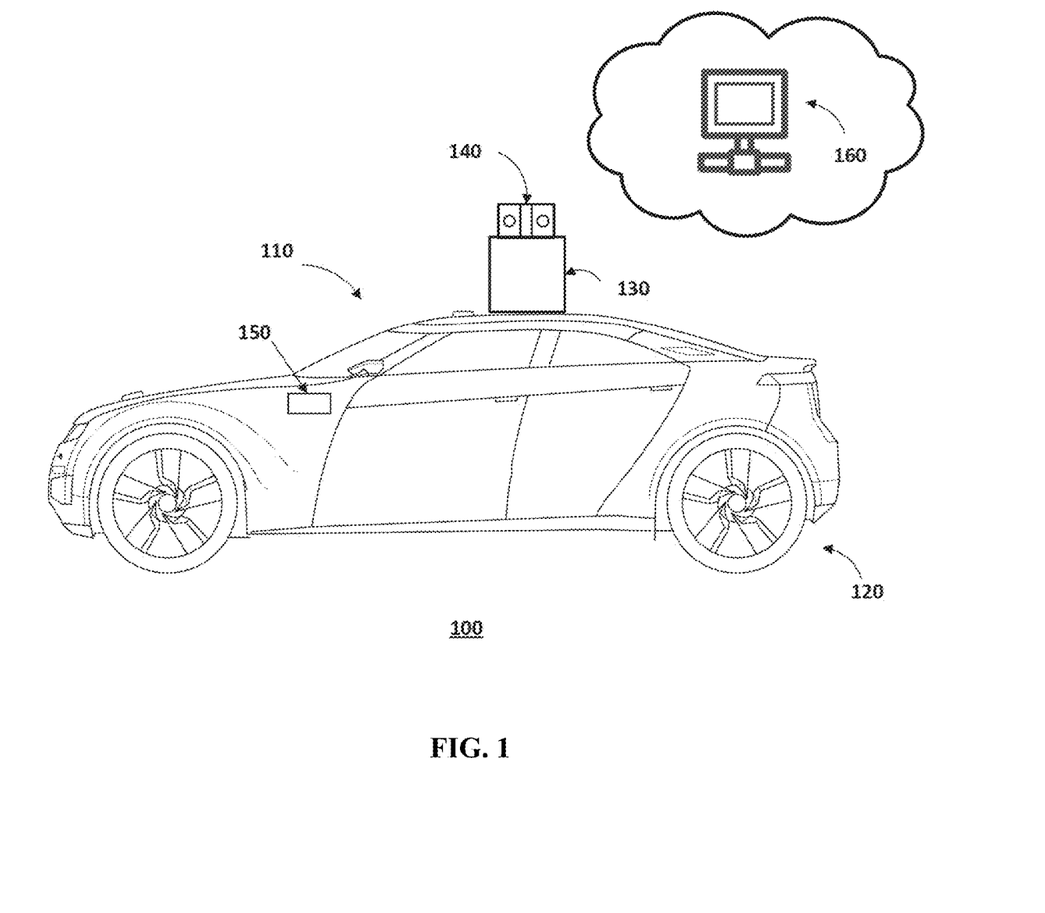
FIG. 1 illustrates a schematic diagram of an exemplary vehicle equipped with sensors, according to embodiments of the disclosure.

FIG. 1 illustrates a schematic diagram of an exemplary vehicle 100 having a plurality of sensors 140 and 150, according to embodiments of the disclosure. Consistent with some embodiments, vehicle 100 may be a survey vehicle configured for acquiring data for constructing a high-resolution map or three-dimensional (3-D) city modeling. It is contemplated that vehicle 100 may be an electric vehicle, a fuel cell vehicle, a hybrid vehicle, or a conventional internal combustion engine vehicle. Vehicle 100 may have a body 110 and at least one wheel 120. Body 110 may be any body style, such as a sports vehicle, a coupe, a sedan, a pick-up truck, a station wagon, a sports utility vehicle (SUV), a minivan, or a conversion van. In some embodiments, vehicle 100 may include a pair of front wheels and a pair of rear wheels, as illustrated in FIG. 1. However, it is contemplated that vehicle 100 may have more or less wheels or equivalent structures that enable vehicle 100 to move around. Vehicle 100 may be configured to be all wheel drive (AWD), front wheel drive (FWR), or rear wheel drive (RWD). In some embodiments, vehicle 100 may be configured to be operated by an operator occupying the vehicle, remotely controlled, and/or autonomous.

As illustrated in FIG. 1, vehicle 100 may be equipped with sensor 140 mounted to body 110 via a mounting structure 130. Mounting structure 130 may be an electro-mechanical device installed or otherwise attached to body 110 of vehicle 100. In some embodiments, mounting structure 130 may use screws, adhesives, or another mounting mechanism. Vehicle 100 may be additionally equipped with sensor 150 inside or outside body 110 using any suitable mounting mechanisms. It is contemplated that the manners in which sensor 140 or 150 can be equipped on vehicle 100 are not limited by the example shown in FIG. 1, and may be modified depending on the types of sensors of 140/150 and/or vehicle 100 to achieve desirable sensing performance.

In some embodiments, sensors 140 and 150 may be configured to capture data as vehicle 100 travels along a trajectory. Consistent with the present disclosure, sensor 140 may be a binocular camera configured to take pictures or videos of the surrounding. Binocular cameras have two optical systems mounted side-by-side and aligned to point in the same direction. Because of the dual viewpoints, images captured by binocular cameras contain depth information. It is contemplated that other suitable cameras or sensors that are able to sense depth information may be used. As vehicle 100 travels along the trajectory, sensor 140 may continuously capture data. Each set of scene data captured at a certain time point is known as a data frame. For example, sensor 140 may record a video consisting of multiple image frames captured at multiple time points. Consistent with the present disclosure, sensor 140 may capture a series of binocular image frames of a scene as vehicle 100 travels along a trajectory near or around the scene. The binocular image frames may be transmitted to a server 160 in real-time (e.g., by streaming), or collectively after vehicle 100 completes the entire trajectory.

As illustrated in FIG. 1, vehicle 100 may be additionally equipped with sensor 150, which may include sensors used in a navigation unit, such as a GPS receiver and one or more IMU sensors. A GPS is a global navigation satellite system that provides geolocation and time information to a GPS receiver. An IMU is an electronic device that measures and provides a vehicle's specific force, angular rate, and sometimes the magnetic field surrounding the vehicle, using various inertial sensors, such as accelerometers and gyroscopes, sometimes also magnetometers. By combining the GPS receiver and the IMU sensor, sensor 150 can provide real-time pose information of vehicle 100 as it travels, including the positions and orientations (e.g., Euler angles) of vehicle 100 at each time point. Consistent with the present disclosure, sensor 150 may take measurements of pose information at the same time points where sensor 140 captures the image frames. Accordingly, the pose information may be associated with the respective image frames. In some embodiments, the combination of an image frame and its associated pose information may be used to position vehicle 100.

Consistent with the present disclosure, sensors 140 and 150 may communicate with server 160. In some embodiments, server 160 may be a local physical server, a cloud server (as illustrated in FIG. 1), a virtual server, a distributed server, or any other suitable computing device. Consistent with the present disclosure, server 160 may store a high-resolution map. In some embodiments, the high-resolution map may be originally constructed using point cloud data acquired by a LiDAR laser scanner. LiDAR measures distance to a target by illuminating the target with pulsed laser light and measuring the reflected pulses with a sensor. Differences in laser return times and wavelengths can then be used to construct digital 3-D representations of the target. The light used for LiDAR scan may be ultraviolet, visible, or near infrared. Because a narrow laser beam can map physical features with very high resolution, LiDAR scanner is particularly suitable for high-resolution map surveys.

Consistent with the present disclosure, server 160 may be also responsible for updating the high-resolution map from time to time to reflect changes at certain portions of the map. Instead of re-surveying the area using a LiDAR, server 160 may obtain data captured of the changing object(s) at varying positions as vehicle 100 travels along a trajectory near the changing object(s). Server 160 may use the acquired data to update the high-resolution map. For example, server 160 may obtain data from sensors 140 and 150. Server 160 may communicate with sensors 140, 150, and/or other components of vehicle 100 via a network, such as a Wireless Local Area Network (WLAN), a Wide Area Network (WAN), wireless networks such as radio waves, a cellular network, a satellite communication network, and/or a local or short-range wireless network (e.g., Bluetooth™).

Figure 2:
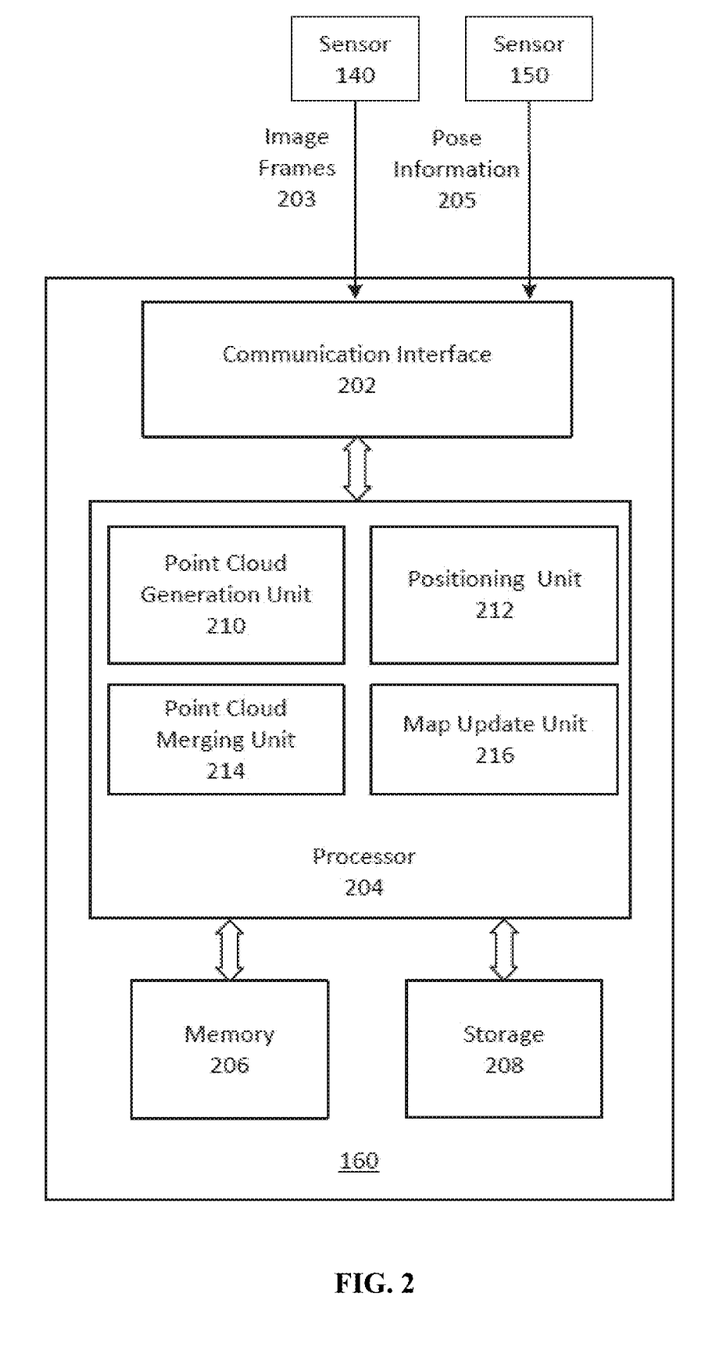
FIG. 2 illustrates a block diagram of an exemplary system for updating a high-resolution map, according to embodiments of the disclosure.

For example, FIG. 2 illustrates a block diagram of an exemplary server 160 for updating a high-resolution map, according to embodiments of the disclosure. Consistent with the present disclosure, server 160 may receive binocular image frames from sensor 140 and vehicle pose information from sensor 150. Based on the binocular image frames, server 160 may generate 3-D point cloud frames, which are then used, along with the pose information, to position vehicle 100 along the trajectory it travels. Using the vehicle positions, server 160 may merge, filter, or otherwise aggregate the point cloud frames to reconstruct a point cloud for the portion of the high-resolution map that needs an update. In some embodiments, server 160 may determine how the map should be updated based on the size of the portion to be updated. For example, if the portion is relatively small, e.g., a traffic sign or a fence, the merged point cloud may be used to update the map. Otherwise, if the portion is rather large, e.g., a newly developed block, or an expanded road, server 160 may decide to dispatch a survey vehicle equipped with LiDAR to re-survey that portion.

In some embodiments, as shown in FIG. 2, server 160 may include a communication interface 202, a processor 204, a memory 206, and a storage 208. In some embodiments, server 160 may have different modules in a single device, such as an integrated circuit (IC) chip (implemented as an application-specific integrated circuit (ASIC) or a field-programmable gate array (FPGA)), or separate devices with dedicated functions. In some embodiments, one or more components of server 160 may be located in a cloud, or may be alternatively in a single location (such as inside vehicle 100 or a mobile device) or distributed locations. Components of server 160 may be in an integrated device, or distributed at different locations but communicate with each other through a network (not shown).

Communication interface 202 may send data to and receive data from components such as sensors 140 and 150 via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 202 can be an integrated services digital network (ISDN) card, cable modem, satellite modem, or a modem to provide a data communication connection. As another example, communication interface 202 can be a local area network (LAN) card to provide a data communication connection to a compatible LAN. Wireless links can also be implemented by communication interface 202. In such an implementation, communication interface 202 can send and receive electrical, electromagnetic or optical signals that carry digital data streams representing various types of information via a network.

Consistent with some embodiments, communication interface 202 may receive data such as a video consisting image frames 203 captured by sensor 140, as well as pose information 205 captured by sensor 150. Communication interface may further provide the received data to storage 208 for storage or to processor 204 for processing. Communication interface 202 may also receive a point cloud generated by processor 204, and provide the point cloud to any local component in vehicle 100 or any remote device via a network.

Processor 204 may include any appropriate type of general-purpose or special-purpose microprocessor, digital signal processor, or microcontroller. Processor 204 may be configured as a separate processor module dedicated to updating the high-resolution map. Alternatively, processor 204 may be configured as a shared processor module for performing other functions unrelated to color point cloud generation.

As shown in FIG. 2, processor 204 may include multiple modules, such as a point cloud generation unit 210, a positioning unit 212, a point cloud merging unit 214, and a map update unit 216, and the like. These modules (and any corresponding sub-modules or sub-units) can be hardware units (e.g., portions of an integrated circuit) of processor 204 designed for use with other components or software units implemented by processor 204 through executing at least part of a program. The program may be stored on a computer-readable medium, and when executed by processor 204, it may perform one or more functions. Although FIG. 2 shows units 210-216 all within one processor 204, it is contemplated that these units may be distributed among multiple processors located near or remotely with each other.

Point cloud generation unit 210 may be configured to generate point cloud frames based on image frames 203. The generated point cloud frames may be color point cloud frames. In some embodiments, image frames 203 may be binocular images. Point cloud generation unit 210 may be configured to estimate a binocular disparity map based on the binocular images. Binocular disparity refers to the difference in image location of an object seen by the left and right optical systems of a binocular camera. In some embodiments, the binocular disparity map may be determined using patch matching methods. For example, matching patches are identified from images of the two binocular viewpoints to determine the disparity. In some embodiments consistent with the present disclosure, machine learning methods may be applied to determine the binocular disparity. For example, a neural network (e.g., a convolutional neural network) may be pretrained to process the binocular images and determine the binocular disparity map. Unlike patch matching methods that rely heavily on textures of the object, machine learning methods are particularly suitable for determining disparity for areas with light texture information. For example, for a patch matching method to determine the disparity for a largely planar road, it has to rely on the lane markings to provide the depth information. In contrast, machine learning methods may extract more non-textural features to aid the disparity estimation.

From the binocular disparity map, point cloud generation unit 210 may extract depth information. Depth of an image pixel is defined as the distance between the image pixel and the camera. In some embodiments, extraction of depth information may be based on camera parameters and length of the baseline. Consistent with the present disclosure, the camera parameters may be obtained through a calibration of sensor 140 performed before vehicle 100 performing the survey. Additionally or alternatively, sensor 150 may also be calibrated before the survey.

Point cloud generation unit 210 may then map and transform the extracted depth information to obtain the 3-D coordinates of the pixels in the camera coordinate system. Accordingly, a 3-D point cloud frame may be generated for each image frame by aggregating the 3-D coordinates of the pixels in that image frame. In some embodiments, point cloud generation unit 210 may generate the point cloud frame in real-time.

Based on the generated 3-D point cloud frames, positioning unit 212 may be configured to position the vehicle, e.g., vehicle 100 on which sensor 140 is equipped, with respect to the trajectory. In some embodiments, the positions of the vehicle on the trajectory are determined corresponding to the time points when the image frames are captured. In addition to the point cloud frame, positioning unit 212 may pull additional position information to improve the positioning accuracy. For example, positioning unit 212 may use pose information 205 acquired by sensor 150, such as a GPS receiver and one or more IMU sensors. Pose information 205 may be acquired in real-time at the corresponding time points when the image frames are captured. For example, the real-time pose information may include the position and orientation of vehicle 100 at each time point. In some embodiments, positioning unit 212 may additionally use the existing high-resolution map to help positioning vehicle 100.

In some embodiments, positioning unit 212 may use a Particle Swarm Optimization (PSO) method for iteratively positioning vehicle 100 on the trajectory. The PSO method is a computational method that optimizes a problem by iteratively improving a candidate solution with regard to a given measure of quality. For example, positioning unit 212 may use the PSO method to generate a rough estimate of the vehicle position based on pose information with sparse spatial distribution. As vehicle 100 moves along the trajectory and more information is acquired during the process, the spatial distribution of the pose information may be refined and the estimation of the vehicle position may be improved. Positioning unit 212 may match the estimated vehicle pose distribution with a corresponding location on the high-resolution map, and thus positioning vehicle 100 on the map.

In some embodiments, the vehicle positions may be associated with the respective point cloud frames. Point cloud merging unit 214 may be configured to merge the point cloud frames according to the associated vehicle positions. For example, the point clouds may be staggered spatially according to the vehicle positions to generate a merged point cloud. In some embodiments, the merged cloud point may be filtered to enhance smoothness and remove any inhomogeneous data points. In some embodiments, point cloud merging unit 214 may further match the merged cloud point with a portion of the high-resolution map. For example, a Normal Distribution Transformation (NDT) method may be used for the matching.

Map update unit 216 may be configured to determine a map update strategy and update the high-resolution map accordingly. In some embodiments, map update unit 216 may determine the size of the portion of the map matched by point cloud merging unit 214. For example, the size may be indicated by a length, width, or area of the matched map portion. In some embodiments, map update unit 216 may compare the size of the portion to a predetermined size threshold. If the size is smaller than the threshold, for example, when the portion of the map is a traffic sign or a fence, map update unit 216 may automatically update the portion of the map using the merged point cloud. If the size is larger than the threshold, for example, when the portion of the map is a newly developed block or an expanded road, map update unit 216 may initiate a survey request to dispatch a survey vehicle equipped with LiDAR to re-survey the area.

In some embodiments, processor 204 may additionally include a sensor calibration unit (not shown) configured to determine one or more calibration parameters associated with sensor 140 or 150. In some embodiments, the sensor calibration unit may instead be inside vehicle 100, in a mobile device, or otherwise located remotely from processor 204. Sensor calibration, including calibration of the binocular camera and the positioning sensor(s), is used for obtaining the projection relationship between point clouds and images. The accuracy of sensor calibration may be affected by the distance between the target (e.g., objects surrounding vehicle 100 in the captured scene) and the sensors (e.g., sensors 140 and 150 equipped on vehicle 100). The smaller the distance is, the more accurate the calibration may be. The sensor calibration unit may calculate one or more calibration parameters of the point cloud and the matching image, such as rotation matrices and translation vectors, based on the 3-D to 2-D transformation relationship of the feature point(s). To increase the calibration accuracy, the sensor calibration unit may provide different calibration parameters based on the varying distances between the point cloud segment and vehicle 100.

Memory 206 and storage 208 may include any appropriate type of mass storage provided to store any type of information that processor 204 may need to operate. Memory 206 and storage 208 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 206 and/or storage 208 may be configured to store one or more computer programs that may be executed by processor 204 to perform color point cloud generation functions disclosed herein. For example, memory 206 and/or storage 208 may be configured to store program(s) that may be executed by processor 204 to update a high-resolution map based on image frames captured by a binocular camera.

Memory 206 and/or storage 208 may be further configured to store information and data used by processor 204. For instance, memory 206 and/or storage 208 may be configured to store the various types of data (e.g., image frames, pose information, etc.) captured by sensors 140 and 150 and the high-resolution map. Memory 206 and/or storage 208 may also store intermediate data such as machine learning models, binocular disparity maps, and point clouds, etc. The various types of data may be stored permanently, removed periodically, or disregarded immediately after each frame of data is processed.

Figure 3:
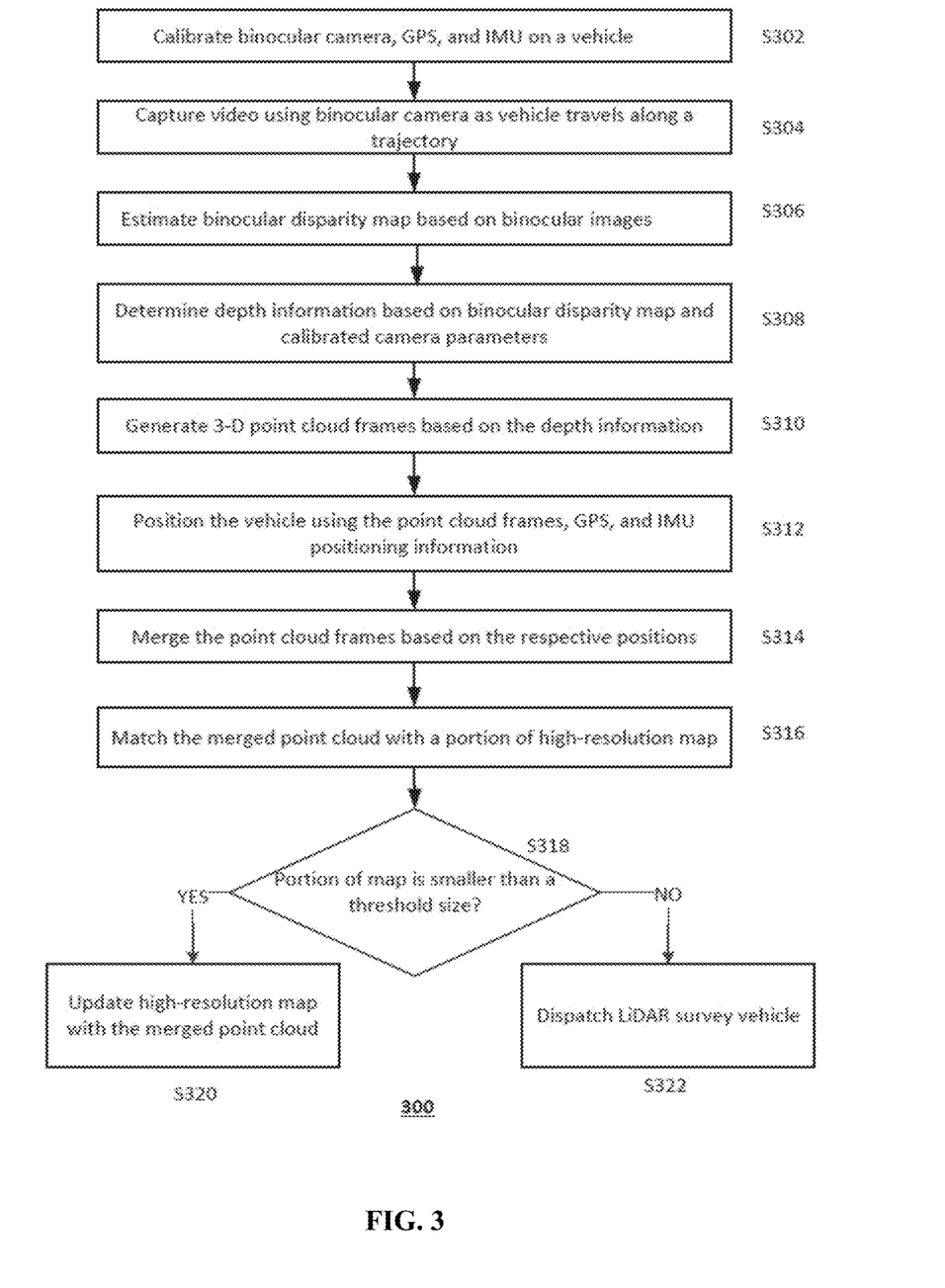
FIG. 3 illustrates a flowchart of an exemplary method for updating a high-resolution map, according to embodiments of the disclosure.

FIG. 3 illustrates a flowchart of an exemplary method 300 for updating a high-resolution map, according to embodiments of the disclosure. In some embodiments, method 300 may be implemented by a map update system that includes, among other things, server 160 and sensors 140 and 150. However, method 300 is not limited to that exemplary embodiment. Method 300 may include steps S302-S322 as described below. It is to be appreciated that some of the steps may be optional to perform the disclosure provided herein. Further, some of the steps may be performed simultaneously, or in a different order than shown in FIG. 3.

In step S302, one or more of sensors 140 and 150 may be calibrated. In some embodiments, vehicle 100 may be dispatched for a calibration trip to collect data used for calibrating sensor parameters. Calibration may occur before the actual survey is performed for updating the map. The calibration parameters include, for example, rotation matrices and translation vectors for transforming pixels in the images captured by a binocular camera (as an example of sensor 140) to feature points in the corresponding point cloud. Calibration may also be performed for sensor 150 that includes positioning devices such as a GPS receiver and one or more IMU sensors.

In step S304, sensor 140 may capture a video of the surrounding as vehicle 100 travels along a trajectory. In some embodiments, vehicle 100 may be dispatched to survey an area that is known or suspected to have changed. As vehicle 100 moves along the trajectory, sensor 140 may capture a video of the surrounding scene. In some embodiments, the video may consist of multiple frames of binocular images, each frame being captured at a particular time point when vehicle is at a particular position on the trajectory.

Figure 4:
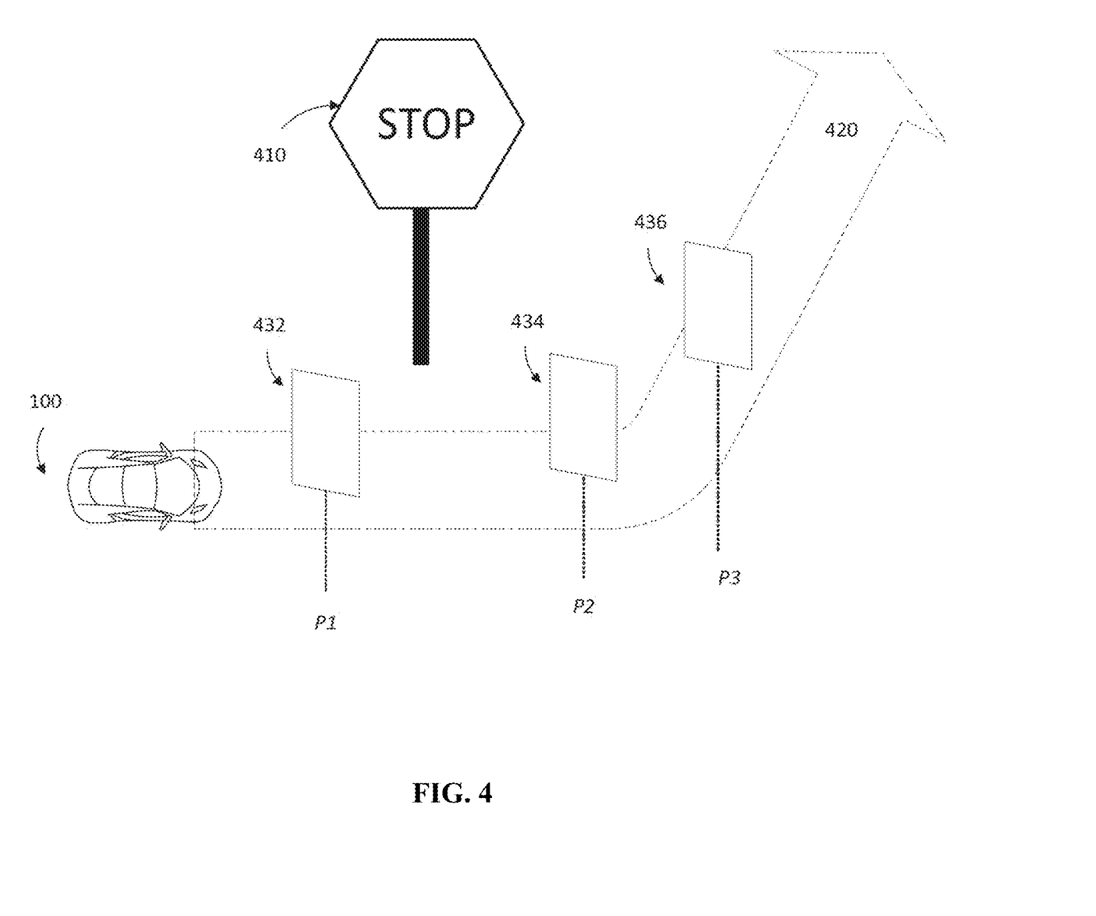
FIG. 4 illustrates an exemplary binocular image acquisition process, according to embodiments of the disclosure.

For example, FIG. 4 illustrates an exemplary binocular image acquisition process, according to embodiments of the disclosure. As shown in FIG. 4, vehicle 100 may be dispatched to survey an area that includes a new traffic sign 410. Vehicle 100 may travel along a trajectory 420. In some embodiments, trajectory 420 may be pre-determined by server 160 and informed to vehicle 100 as part of the survey assignment. In some other embodiments, vehicle 100 may dynamically and adaptively determine trajectory 420 during the survey in order to best track and capture data of traffic sign 410.

As vehicle 100 travels along trajectory 420, sensor 140 may capture a video of the area including new traffic sign 410. The video may contain image frames captured at a set of time points. For example, when sensor 140 is a binocular camera, the image frames captured are binocular images.

Typically, a set time interval is used between every two time points. For example, a new image frame may be captured every 1 ms, 2 ms, or the like. Vehicle 100 is at a different position corresponding to each time point when an image frame is captured. Accordingly, each image frame can be associated with a vehicle position. For example, image frame 432 is associated with vehicle location P1, image frame 434 is associated with vehicle location P2, and image frame 436 is associated with vehicle location P3. By moving vehicle 100 along trajectory 420 and continuously capture image frames of the surrounding scene, vehicle 100 may capture data sufficient to update a portion of the high-resolution map.

In some embodiments, in addition to image frames captured by sensor 140, sensor 150 (e.g., including a GPS receiver and one or more IMU sensors) equipped on vehicle 100 may also acquire pose information of vehicle 100, including time, positions, and orientations. Pose information may be acquired at the same vehicle positions (e.g., P1, P2, P3 . . . ) and/or time points as the captured image frames. Accordingly, pose information acquired at vehicle positions P1, P2, and P3 may be associated with images 432, 434, and 436, respectively.

In some embodiments, the captured data, including e.g., image frames and pose information, may be transmitted from sensors 140/150 to server 160 in real-time. For example, the data may be streamed as they become available. Real-time transmission of data enables server 160 to process the data frame by frame in real-time while subsequent frames are being captured. Alternatively, data may be transmitted in bulk after a section of, or the entire survey is completed.

Returning to FIG. 3, in step S306, server 160 may estimate a binocular disparity map based on the binocular image frames captured in step S304. Each frame of binocular images may include a pair of images each captured by one viewpoint. The differences between the pair of images provide depth information that can be later used to reconstruct 3-D positions of each image pixel. In some embodiments, server 160 may implement a patch matching method to determine the disparity by comparing corresponding patches in images captured by the two binocular viewpoints. Consistent with the present disclosure, server 160 may alternatively or additionally implement a machine learning method to determine the disparity. Machine learning methods can extract non-textural features and thus may offer better disparity estimation especially for regions that comprise mostly planar surfaces with very limited textures, such as a road with mostly planar pavement. In some embodiments, a neural network (e.g., a convolutional neural network) may be used to process the binocular images and determine the binocular disparity map. The neural network may be trained offline with a large number of samples, and then applied to estimate the disparity map in real-time or near real-time.

In step S308, server 160 may determine depth information based on the estimated binocular disparity map in step S306 and calibrated sensor parameters in step S302. For example, server 160 may determine the distance between a pixel and the camera based on the binocular disparity map. In some embodiments, extraction of depth information may be additionally based on the length of the baseline.

In step S310, server 160 may use the depth information to map and transform each image pixel into the camera coordinate system. In some embodiments, the 3-D coordinates of each pixel in the camera coordinate system may be determined. Server 160 may further aggregate the 3-D coordinates of all of the pixels in an image frame to construct a 3-D point cloud corresponding to that image frame. Such a point cloud is referred to as a point cloud frame. In some embodiments, with the assistance of a well-trained machine learning model, the point cloud generation may be in real-time.

In step S312, server 160 may position vehicle 100 using the point cloud frames generated in step S310. For example, the positions of the vehicle on the trajectory can be determined corresponding to the time points when the image frames are captures. In some embodiments, server 160 may additionally use the pose information captured by sensor 150 to enhance positioning accuracy, and/or use the existing high-resolution map stored in memory 206/storage 208.

In some embodiments, a PSO method may be used for iteratively positioning vehicle 100 on the trajectory. For example, as the first few frames of data start to come in, the PSO method may generate an initial estimate of the spatial distribution of vehicle pose information. The initial estimate is likely rough and sparse. As vehicle 100 moves along trajectory 420 and more data frames are transmitted to server 160, the spatial distribution of the pose information may be refined. In some embodiments, the estimated vehicle pose distribution may be matched to the existing high-resolution map, to determine the position of vehicle 100. In some embodiments, the vehicle positions may be associated with the respective point cloud frames.

Figure 5:
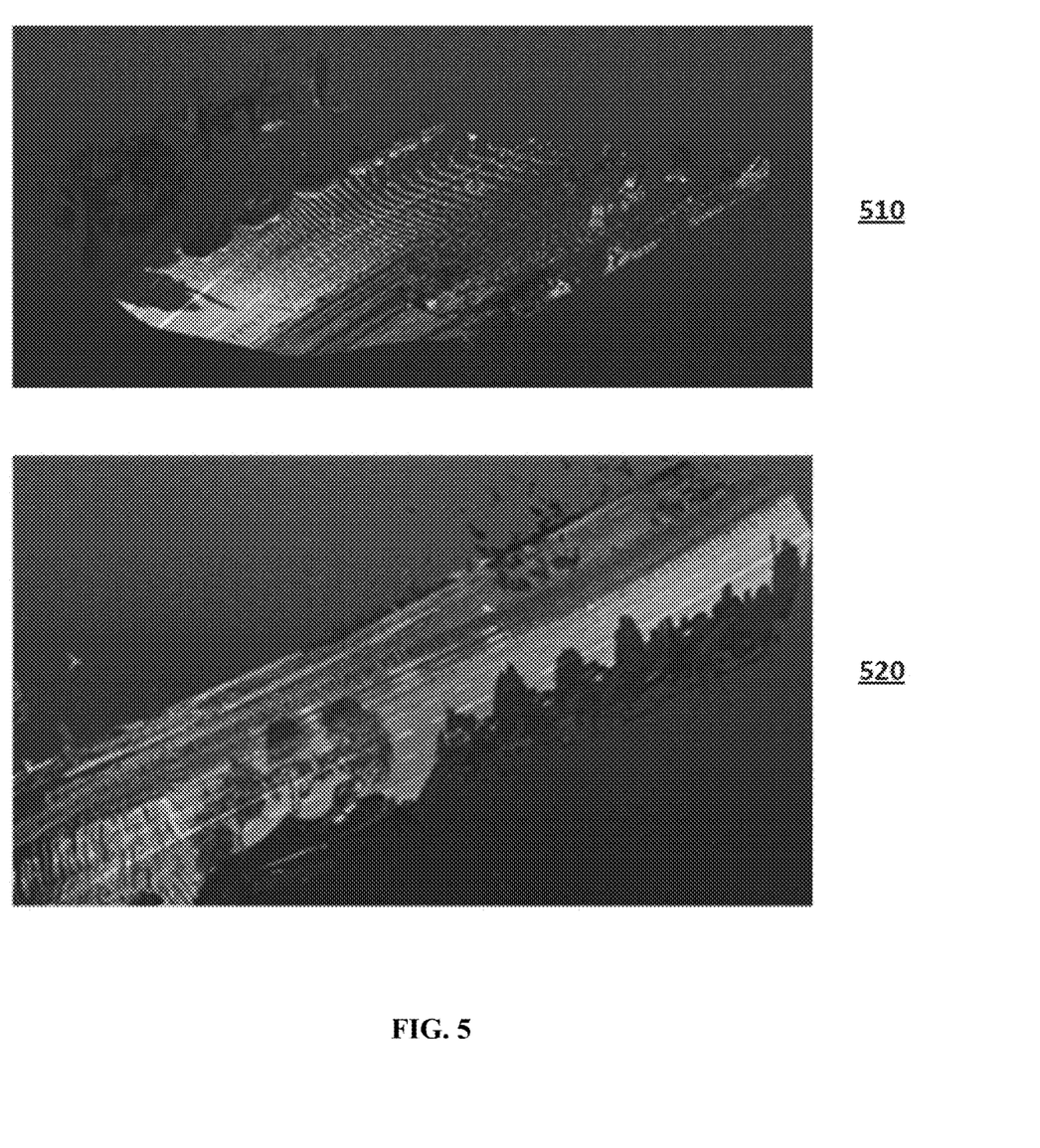
FIG. 5 illustrates an exemplary individual point cloud frame and an exemplary merged point cloud, according to embodiments of the disclosure.

In step S314, server 160 may merge the point cloud frames according to the associated vehicle positions. For example, the point clouds may be staggered spatially according to the vehicle positions. In some embodiments, the merged cloud point may be filtered to enhance smoothness and remove any inhomogeneous data points. In some embodiments, the merged cloud point may be matched with a portion of the high-resolution map in S316. For example, a NDT method may be used for the matching. FIG. 5 illustrates an exemplary individual point cloud frame 510 and an exemplary merged point cloud 520, according to embodiments of the disclosure. As shown by FIG. 5, the merged point cloud 520 is much denser than point cloud frame 510, and reflects the objects of the scene more accurately.

In step S318, server 160 may determine whether the size of the matched portion of the map is smaller than a predetermined threshold size. In some embodiments, the size may be indicated by the length, width or area of the matched map portion. If the size is smaller than the threshold, for example (S318: Yes), server 160 may automatically update the portion of the map using the merged point cloud in step S320. If the size is larger than the threshold (S318: No), server 160 may initiate a survey request to dispatch a survey vehicle equipped with LiDAR to re-survey the area in step S322.

Statistically, changes involving smaller areas, such as traffic signs, fences, pedestrian lane markings, traffic lights, may occur much more often than changes involving large areas, such as new developments, drastic road expansion or re-routing, etc. Therefore, using the proposed systems and methods, server 160 may perform most map updates using inexpensive binocular cameras, rather than dispatching the more costly LiDAR survey vehicles.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for updating a high-resolution map, comprising:
a communication interface configured to receive a plurality of image frames captured by a binocular camera equipped on a vehicle, as the vehicle travels along a trajectory;
a storage configured to store the high-resolution map and the plurality of image frames; and
at least one processor, configured to:
generate point cloud frames based on the respective image frames;
position the vehicle using the point cloud frames;
merge the point cloud frames based on the respective vehicle positions;
update a portion of the high-resolution map based on the merged point cloud;
determine that the portion of the high-resolution map is larger than a threshold size; and
dispatch a survey vehicle equipped with a Light Detection and Ranging radar to survey the portion of the high-resolution map.

2. The system of claim 1, wherein to generate a point cloud frame based on an image frame, the at least one processor is configured to:
estimate depth information of each pixel in an image frame; and
determine three dimensional coordinates of the pixel based on the depth information.

3. The system of claim 2, wherein to estimate depth information, the at least one processor is configured to:
estimate a binocular disparity map based on the image frame; and
estimate the depth information using the binocular disparity and parameters of the binocular camera.

4. The system of claim 3, wherein the at least one processor is further configured to calibrate the binocular camera to determine the parameters of the binocular camera.

5. The system of claim 3, wherein the binocular disparity map is estimated using a pre-trained neural network.

6. The system of claim 1, wherein to position the vehicle, the processor is further configured to:
generate position information of the vehicle based on the point cloud frames and pose information acquired by a positioning system; and
match the position information with the high-resolution map.

7. The system of claim 6, wherein the positioning system includes at least one of a Global Positioning System or an Inertial Measurement Unit.

8. The system of claim 1, wherein the at least one processor is further configured to:
determine that the portion of the high-resolution map is smaller than a threshold size; and
update the portion of the high-resolution map with the merged point cloud.

9. A method for updating a high-resolution map, comprising:
receiving, by a communication interface, a plurality of image frames captured by a binocular camera equipped on a vehicle, as the vehicle travels along a trajectory;
generating, by at least one processor, point cloud frames based on the respective image frames;
positioning, by the at least one processor, the vehicle using the point cloud frames;
merging, by the at least one processor, the point cloud frames based on the respective vehicle positions;
updating, by the at least one processor, a portion of the high-resolution map based on the merged point cloud;
determining that the portion of the high-resolution map is larger than a threshold size; and
dispatching a survey vehicle equipped with a Light Detection and Ranging radar to survey the portion of the high-resolution map.

10. The method of claim 9, wherein generating a point cloud frame based on an image frame includes:
estimating depth information of each pixel in the image frame; and
determining three dimensional coordinates of the pixel based on the depth information.

11. The method of claim 10, wherein estimating depth information includes:
estimating a binocular disparity map based on the image frame; and
estimating the depth information using the binocular disparity and parameters of the binocular camera.

12. The method of claim 11, further including calibrating the binocular camera to determine the parameters of the binocular camera.

13. The method of claim 11, wherein the binocular disparity map is estimated using a pre-trained neural network.

14. The method of claim 9, wherein positioning the vehicle further includes:
generating position information of the vehicle based on the point cloud frames and pose information acquired by a positioning system; and
matching the position information with the high-resolution map.

15. The method of claim 9, further including:
determining that the portion of the high-resolution map is smaller than a threshold size; and
updating the portion of the high-resolution map with the merged point cloud.

16. A non-transitory computer-readable medium having a computer program stored thereon, wherein the computer program, when executed by at least one processor, performs a method for updating a high-resolution map, the method comprising:
receiving a plurality of image frames captured by a binocular camera equipped on a vehicle, as the vehicle travels along a trajectory;
generating point cloud frames based on the respective image frames;
positioning the vehicle using the point cloud frames;
merging the point cloud frames based on the vehicle positions;

updating a portion of the high-resolution map based on the merged point cloud;
determining that the portion of the high-resolution map is larger than a threshold size; and
dispatching a survey vehicle equipped with a Light Detection and Ranging radar to survey the portion of the high-resolution map.

17. The non-transitory computer-readable medium of claim 16, wherein the method further includes:
determining that the portion of the high-resolution map is smaller than a threshold size; and
updating the portion of the high-resolution map with the merged point cloud.

\* \* \* \* \*